US012673719B2

(12) United States Patent
Erdinc et al.

(10) Patent No.: US 12,673,719 B2
(45) Date of Patent: Jul. 7, 2026

(54) STEERABLE WHEEL AXLE ARRANGEMENT AND METHOD OF CONTROLLING A STEERABLE WHEEL AXLE ARRANGEMENT

(71) Applicant: Volvo Truck Corporation, Gothenburg (SE)

(72) Inventors: Umur Erdinc, Gothenburg (SE); Adithya Arikere, Gothenburg (SE); Leon Henderson, Härryda (SE); Nikhil Baliga, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 1079 days.

(21) Appl. No.: 17/694,906

(22) Filed: Mar. 15, 2022

(65) Prior Publication Data

US 2022/0297748 A1 Sep. 22, 2022

(30) Foreign Application Priority Data

Mar. 22, 2021 (EP) ...................................... 21163870

(51) Int. Cl.
*B62K 25/30* (2006.01)
*B60T 13/68* (2006.01)
(Continued)

(52) U.S. Cl.
CPC .............. *B62D 5/12* (2013.01); *B60T 13/686* (2013.01); *B62D 7/08* (2013.01); *B60T 2260/02* (2013.01)

(58) Field of Classification Search
CPC ... B62D 5/12; B62D 7/08; B62D 5/30; B62D 11/183; B62D 11/08; B60T 13/686; B60T 2260/02; B60T 13/36; D62D 9/005
(Continued)

(56) References Cited

U.S. PATENT DOCUMENTS 3,734,228 A * 5/1973 Rivolier .................... B62D 9/00
                                                         280/90
3,888,328 A * 6/1975 Leiber .................... B60T 8/1755
                                                         188/112 A (Continued)

FOREIGN PATENT DOCUMENTS

CN        104169139 A     11/2014
CN        109109972 A      1/2019
(Continued)

OTHER PUBLICATIONS

Extended European Search Report for European Patent Application No. 211638703.5, mailed Aug. 31, 2021, 10 pages.
(Continued)

*Primary Examiner* — Vivek D Koppikar
*Assistant Examiner* — Nabin Kumar Sharma
(74) *Attorney, Agent, or Firm* — Withrow & Terranova, PLLC

(57) ABSTRACT

The present disclosure relates to a steerable wheel axle arrangement for a vehicle, the steerable wheel axle arrangement being connectable to a pair of wheels and comprising a steering linkage connectable to the pair of wheels; a cylinder comprising a fluidly controlled piston movable within the cylinder, wherein the fluidly controlled piston is connected to the steering linkage; and a fluidly controlled brake actuator adapted to be in fluid communication with a wheel brake of the vehicle for controlling braking of the wheels, wherein the fluidly controlled brake actuator is arranged in fluid communication with the cylinder, and wherein the fluidly controlled piston exerts a steering force on the steering linkage upon actuation of the fluidly controlled brake actuator for steering the wheels.

12 Claims, 4 Drawing Sheets

(51) Int. Cl.
   *B62D 5/12*      (2006.01)
   *B62D 7/08*      (2006.01)
   *B62K 3/02*      (2006.01)
   *B62K 25/04*     (2006.01)
(58) Field of Classification Search
   USPC ............................................ 180/435; 280/88
   See application file for complete search history.

(56) References Cited

U.S. PATENT DOCUMENTS

| | | | | |
|---|---|---|---|---|
| 5,307,892 | A | 5/1994 | Phillips | |
| 6,216,806 | B1 * | 4/2001 | Toms ................... | B60T 11/103 180/417 |
| 7,182,353 | B2 * | 2/2007 | Divers .................. | B62D 11/08 280/88 |
| 9,340,187 | B2 | 5/2016 | Hecker et al. | |

FOREIGN PATENT DOCUMENTS

| | | | | | |
|---|---|---|---|---|---|
| CN | 110015342 | A | * | 7/2019 | ............ B62D 5/046 |
| CN | 111094766 | A | | 5/2020 | |
| DE | 3916354 | A1 | | 11/1990 | |
| DE | 4242019 | A1 | | 2/1994 | |
| DE | 10159326 | A1 | | 7/2003 | |
| DE | 10344662 | A1 | | 5/2005 | |
| DE | 102019108620 | A1 | | 10/2020 | |
| EP | 2617626 | A2 | * | 7/2013 | ............ B62D 5/065 |
| GB | 1423233 | A | | 2/1976 | |
| JP | S61275065 | A | * | 12/1986 | .............. B62D 6/00 |
| JP | H0655949 | U | | 8/1994 | |
| JP | 2006248303 | A | | 9/2006 | |
| WO | 2015004136 | A2 | | 1/2015 | |

OTHER PUBLICATIONS

First Office Action for Chinese Patent Application No. 202210222785.1, mailed Feb. 6, 2024, 23 pages.
Examination Report for European Patent Application No. 21163870.5, mailed Jun. 4, 2024, 6 pages.

* cited by examiner

S1

S2

STEERABLE WHEEL AXLE ARRANGEMENT AND METHOD OF CONTROLLING A STEERABLE WHEEL AXLE ARRANGEMENT

RELATED APPLICATIONS

The present application claims priority to European Patent Application No. 21163870.5, filed on Mar. 22, 2021, and entitled "STEERABLE WHEEL AXLE ARRANGEMENT AND METHOD OF CONTROLLING A STEERABLE WHEEL AXLE ARRANGEMENT," which is incorporated herein by reference in its entirety.

FIELD OF THE DISCLOSURE

The present invention relates to a steerable wheel axle arrangement for a vehicle. The present invention also relates to a method of controlling a steerable wheel axle arrangement. The present invention is particularly applicable to trucks. However, although the disclosure will mainly be directed to a vehicle in the form of a truck, it may also be applicable for other types of vehicles as well, such as buses, working machines, etc.

BACKGROUND

Steering systems of various types are available on the market and applied in vehicles. For example, a steering system can conventionally comprise a steering wheel connected to a steering column. The steering column is in turn connected to a steerable wheel axle using e.g. a rack and pinion or steering box arrangement between the steering column and the steerable wheel axle. Another alternative is a so-called steer-by-wire system, in which no mechanical link is present between the steering wheel and the steerable wheel axle.

Conventionally, vehicles, such as e.g. trucks, may comprise a steering system with a single steered axle. In such a case, the maximum turning radius of the vehicle is limited to the capability of the single steered axle and the vehicle dynamic properties of the truck. In certain cases, with relatively long vehicles, where the vehicle is maneuvered in limited spaces, the turning radius of the conventional steering systems may not be sufficient for operating the vehicle as desired. Furthermore, a truck with trailer/semi-trailer combination may also suffers off tracking issues both at high and low speeds. Other problems relate to reduced stability and maneuverability, increased fuel consumption and increased tire wear due to the excessive lateral force on the tires. Due to increased tire wear, tires of the trailers need to be changed more often and tires of the different axles need to be changed at different times, which increases the maintenance time. Thus, the steering systems are in need of further improvements.

SUMMARY

It is thus an object of the present invention to at least partially overcome the above described deficiencies.

According to a first aspect, there is provided a steerable wheel axle arrangement for a vehicle, the steerable wheel axle arrangement being connectable to a pair of wheels and comprising a steering linkage connectable to the pair of wheels; a cylinder comprising a fluidly controlled piston movable within the cylinder, wherein the fluidly controlled piston is connected to the steering linkage, and a fluidly controlled brake actuator adapted to be in fluid communication with a wheel brake of the vehicle for controlling braking of the wheels, wherein the fluidly controlled brake actuator is arranged in fluid communication with the cylinder, and wherein the fluidly controlled piston exerts a steering force on the steering linkage upon actuation of the fluidly controlled brake actuator for steering the wheels.

The fluidly controlled brake actuator should be construed as an actuator primarily used for supply of pressurized fluid to the wheel brake. The wheel brake is thus engaged in a slipping state or a locked state when a pressure level of the supplied fluid from the fluidly controlled brake actuator exceeds a predetermined threshold limit. According to an example embodiment, the fluidly controlled brake actuator may be one of a pneumatic brake actuator or a hydraulic brake actuator.

The present invention is based on the insight that by utilizing an actuator, which is already implemented in the vehicle and used for actuating the brakes of the vehicle, the steering linkage can be arranged as an actuated steering axle. A pressure difference within the cylinder thus controls the piston to generate the steering force on the steering linkage. Thus, when applying substantially the same pressure to the left and right wheel brakes, the piston is substantially stationary. An improved steer-by-braking functionality of the vehicle can hereby be achieved. The vehicle may also hereby be able to improve steering by reducing turning radius, etc. As will also be described further below, the piston can either be arranged to support or oppose the steering effect provided by any differential braking of the vehicle.

Thus, an advantage is that the turning radius during a steering maneuver can be reduced, as well as improved control of a steering operation can be achieved without introducing additional actuators to the steering system. Furthermore, an improved compensation for a yaw moment created by unintentional brake pressure difference is also achieved, as well as an improved compensation for a so-called split friction situation.

According to an example embodiment, the piston may be movable between a first and a second end portion of the cylinder, wherein the fluidly controlled brake actuator is in fluid communication with the first and second end portions.

As will also be evident from the below description, the fluidly controlled brake actuator could be a single brake actuator controlling the flow of fluid to each wheel brake and to the cylinder, where one or more valves are incorporated in the steerable wheel axle arrangement for controlling the flow of pressurized fluid to the brake(s) and the cylinder. The fluidly controlled brake actuator could instead be formed by a first brake actuator connectable to one of the wheel brakes, and a second brake actuator connectable to the other one of the wheel brakes. In the latter case, the first brake actuator is here preferably connected to the first end portion of the cylinder and the second brake actuator is connected to the second end portion of the cylinder.

According to an example embodiment, the steerable wheel axle arrangement may further comprise a steer control valve arrangement arranged in fluid communication between the fluidly controlled brake actuator and the cylinder for controllably directing a flow of fluid from the fluidly controlled brake actuator to the first and second end portions of the cylinder.

The steer control valve could be formed in a number of various manners to fulfill the purpose of directing the flow of fluid to the end portions of the cylinder. For example, the steer control valve could be a bidirectional valve that directs the flow to either the first or second end portions of the cylinder. The steer control valve could alternatively be a valve controlled by a control unit and which valve can control a portion of the pressurized fluid to be directed to the first end portion of the cylinder, and direct another portion of the pressurized flow to the second end portion of the cylinder.

According to an example embodiment, the fluidly controlled brake actuator may comprise a first brake actuator and a second brake actuator, the first brake actuator being arranged in fluid communication with one of the first and second end portions, and the second brake actuator being arranged in fluid communication with the other one of the first and second end portions. As described above, the steerable wheel axle arrangement here comprises one fluidly controlled brake actuator dedicated to supply pressurized fluid to one end portion of the cylinder, and one fluidly controlled brake actuator dedicated to supply pressurized fluid to the other end portion of the cylinder. According to an example embodiment, the first brake actuator may be adapted to be in fluid communication with a first wheel brake, and the second brake actuator may be adapted to be in fluid communication with a second wheel brake.

According to an example embodiment, the steer control valve arrangement may comprise a first steer control valve arranged to controllably deliver a flow of fluid from the first brake actuator to the first or second portions of the cylinder, and a second steer control valve arranged to controllably deliver a flow of fluid from the second brake actuator to the first or second portions of the cylinder. Hereby, each one of the fluidly controlled brake actuators can be used for supplying pressurized flow of fluid to the first as well as the second end portions of the cylinder.

According to an example embodiment, the steer control valve arrangement may be configured to controllably prevent a flow of fluid from being supplied from the fluidly controlled brake actuator to the cylinder. An advantage is that differential braking of the wheels can be executed without generating a steering operation of the wheels.

According to an example embodiment, the fluidly controlled piston may be arranged to exert a steering force on the steering linkage when a pressure level of an actuation fluid from the fluidly controlled brake actuator exceeds a first predetermined threshold limit, and wherein the wheel brake is arranged to be actuated when the pressure level of the actuation fluid exceeds a second predetermined threshold limit, the second predetermined threshold limit being higher than the first predetermined threshold limit.

An advantage is that steering can be achieved without generating a braking action on the wheels. Thus, the so-called "crack pressure" is lower for the fluidly controlled piston of the cylinder compared to the wheel brakes. The crack pressure is thus in this context a pressure level at which the component is actuated.

According to an example embodiment, the cylinder may comprise a motion damper connected to the fluidly controlled piston. Hereby, an improved control of the motion of the steering linkage can be obtained.

According to an example embodiment, the steerable wheel axle arrangement may further comprise a valve arranged in fluid communication between the fluidly controlled brake actuator and the wheel brake, the valve being controllable between a first state, in which the fluidly controlled brake actuator is in fluid communication with the wheel brake, and a second state, in which a flow of fluid from the fluidly controlled brake actuator is prevented from reaching the wheel brake.

An advantage is that steering of the steering linkage can be provided independently of actuation of the wheel brakes, i.e. irrespective of the pressure level of the pressurized fluid.

Also, the second state can preferably be obtained when operating the vehicle during low speeds and when there is a high need for improved maneuverability, such as e.g. in a tight car park. In such a case, fluid only flows from the actuator to the cylinder for improved maneuverability. For higher speeds, the valve can be arranged to assume the first state such that the wheel brake is actuatable by the fluidly controlled brake actuator. According to an example, the flow of fluid may be prevented from reaching the cylinder when the valve assumes the first state, i.e. only the wheel brake is actuatable.

According to an example embodiment, the steering linkage may comprise a steering knuckle connectable to the wheel, a steering rod to which the fluidly controlled piston is connected, and a pivot joint connected between the steering knuckle and the steering rod, wherein the pivot joints pivot and rotates the steering knuckle when the fluidly controlled piston exerts the steering force on the steering rod. Accordingly, when the fluidly controlled piston exerts a force on the steering rod, the pivot joint pivots and rotates the steering knuckle, thereby steering the wheel.

According to a second aspect, there is provided a vehicle comprising a steerable wheel axle arrangement according to any one of the above described embodiments, a pair of wheels connected to the steering linkage, and a wheel brake in fluid communication with the fluidly controlled brake actuator.

According to an example embodiment, the vehicle may further comprise a primary steering system for steering the steerable wheel axle, wherein the cylinder and fluidly controlled piston form part of a secondary steering system.

The primary steering system may, for example, be a manually operable steering system with a steering wheel mechanically connected to the wheels, or a steer-by-wire system, in which no mechanical link is present between the steering wheel and the wheels. The primary steering system could also implement an advanced driver-assistance system (ADAS).

Using the above described cylinder and piston as a secondary steering system provides additional flexibility for control or can specifically aim, and be designed to, reducing so-called split-friction instability, etc. while at the same time controlling the vehicle with main steering operation using a conventional primary steering system via a steering wheel. The secondary steering system can also advantageously be used as a redundant steering system for autonomously controlled vehicle, providing improved safety for such system.

Further effects and features of the second aspect are largely analogous to those described above in relation to the first aspect.

According to a third aspect, there is provided a method of controlling a steering system of a vehicle, the steering system comprising a steerable wheel axle arrangement comprising a steering linkage, a cylinder comprising a fluidly controlled piston movable within the cylinder, wherein the fluidly controlled piston is connected to the steering linkage, and a fluidly controlled brake actuator arranged in fluid communication with a wheel brake of the vehicle, the method comprising receiving a signal indicative of a steering operation for the vehicle, and controlling the fluidly controlled brake actuator to supply a flow of fluid to the cylinder for the piston to exert a steering force on the steering linkage to steer the wheels.

Effects and features of the third aspect are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
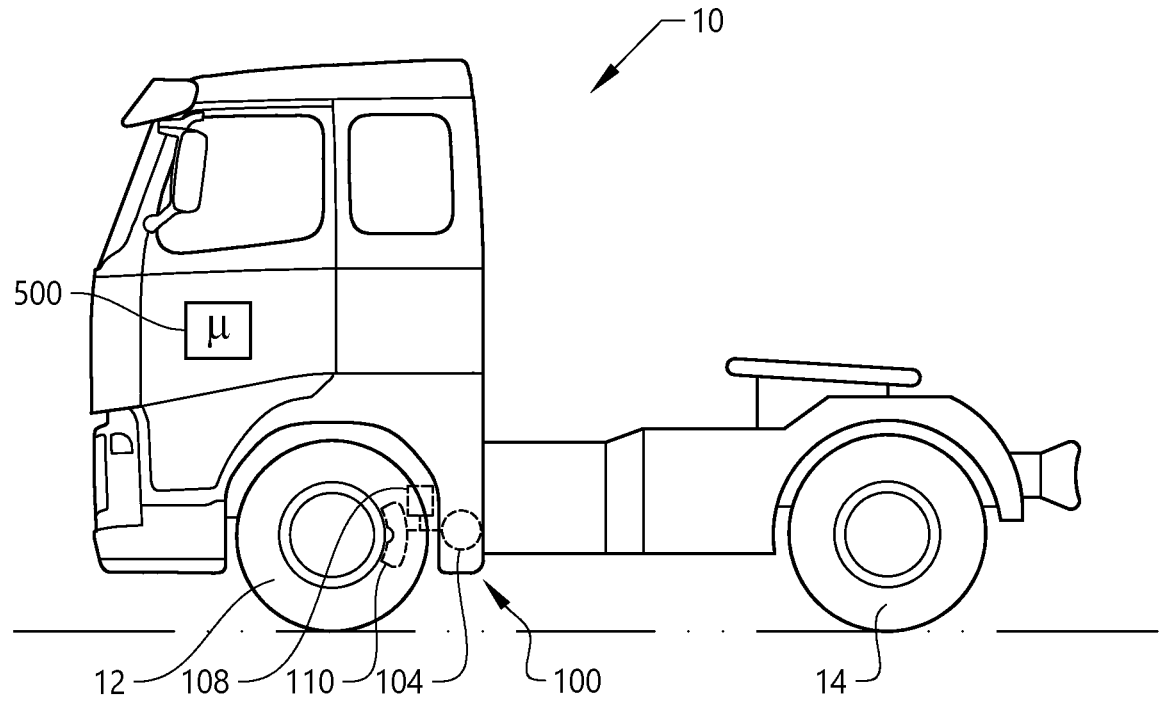
FIG. 1 is a lateral side view illustrating an example embodiment of a vehicle in the form of a truck.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is depicted a vehicle 10 in the form of a truck. The vehicle comprises a pair of front wheels 12, and a pair of rear wheels 14. It should however be readily understood that the present invention is equally applicable for other vehicles, and in particular for other type of trucks, such as a truck comprising further rear wheel pairs, and truck-trailer combinations, etc. As is illustrated in FIG. 1, the vehicle 10 comprises a steerable wheel axle arrangement 100 which will be described in further detail below with reference to FIGS. 2-5. The steerable wheel axle arrangement 100 is in FIG. 1 depicted as connected to the wheel axle of the front wheels 12. In the present embodiment, the wheel axle of the rear wheels 14 is preferably the driven axle. It should however be readily understood that the vehicle may comprise two rear wheel axles, i.e. a first rear wheel axle arranged in front of a second rear wheel axle. The steerable wheel axle arrangement 100 may thus be connected to either the first or the second wheel axles instead of, or in combination with the connection to the wheel axle of the front wheels 12. Furthermore, although not depicted in FIG. 1, the vehicle 10 may comprise a trailer and a dolly and it should thus be readily understood that the steerable wheel axle arrangement 100 can equally as well be connected to any wheel axle of such trailer and/or dolly.

Furthermore, the vehicle comprises a wheel brake 110 connected to fluidly controlled brake actuator 108, where the brakes are actuated when receiving pressurized fluid from the fluidly controlled brake actuator 108. The vehicle 10 also comprises a control unit 500 for controlling the below described steerable wheel axle arrangement 100.

Figure 2:
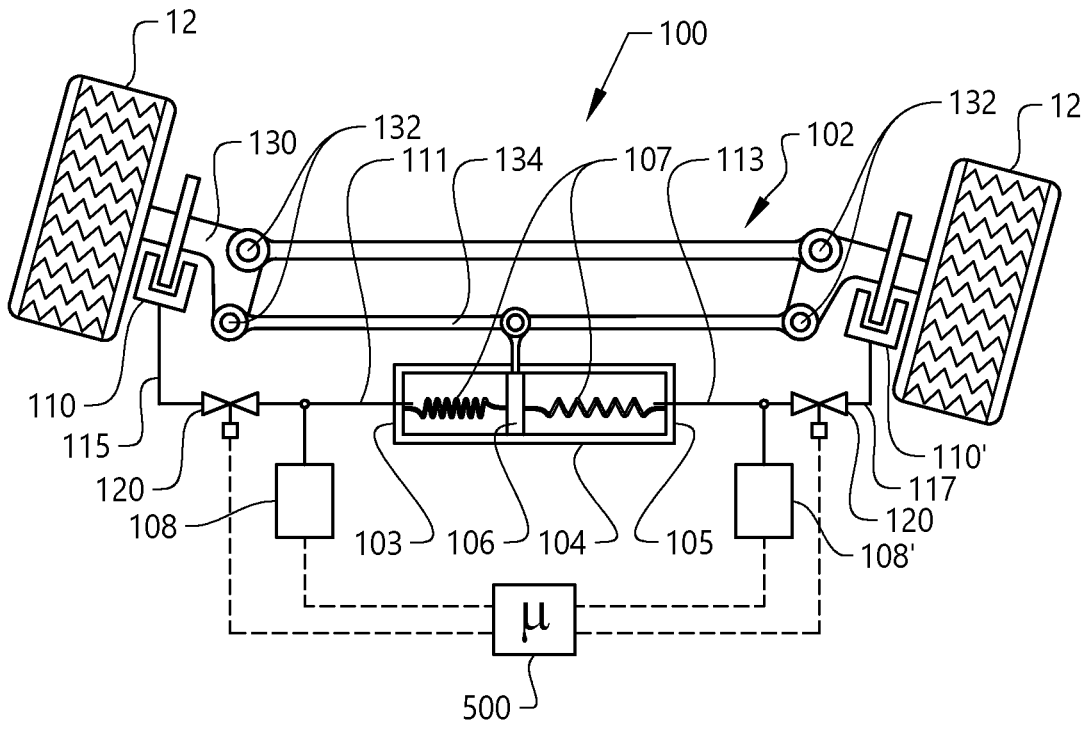
FIG. 2 is a schematic illustration of a steerable wheel axle arrangement according to a first example embodiment.

In order to describe the steerable wheel axle arrangement 100 in further detail, reference is now made to FIGS. 2-5. Starting with FIG. 2, which is a schematic illustration of the steerable wheel axle arrangement according to a first example embodiment. As can be seen in FIG. 2, the steerable wheel axle arrangement 100 comprises a steering linkage 102 connected to a pair of wheels 12. The wheels 12 are in the example embodiment the front steerable wheels but can also be a pair of rear steerable, or non-steerable wheels, as described above. In the example embodiment depicted in FIGS. 2-5, the steering linkage 102 comprises a pair of steering knuckles 130 connected to a respective one of the wheels 12, a steering rod 134 and a pivot joint 132 connected between one of the steering knuckles 130 and the steering rod 134. By moving the steering rod 134 to the right or left side, a rotation of the pivot joint 132 generates a rotation and turning maneuver of the wheel(s) 12. Furthermore, each of the wheels 12 are provided with a wheel brake 110 which illustration is merely schematic for simplified understanding.

Furthermore, the steerable wheel axle arrangement 100 comprises a cylinder 104 comprising a fluidly controlled piston 106. The piston 106 being arranged to move within the cylinder between a first end portion 103 and a second end portion 105 of the cylinder 104 and is connected to the steering linkage 102. In detail, the piston 106 is in the example embodiment depicted in FIG. 2 connected to the steering rod 134 of the steering linkage 102. The cylinder 104 is further provided with a motion damper 107 for controlling the motion of the piston 106 within the cylinder 104. In FIG. 2, the motion damper 107 is illustrated as a pair of springs connected on a respective side of the piston 106. Other motion dampers are also conceivable and could be connected to the piston 106 at a position outside the cylinder, etc.

The steerable wheel axle arrangement 100 further comprises a first 108 and a second 108' fluidly controlled brake actuator. The fluidly controlled brake actuators can be either pneumatically controlled or hydraulically controlled, i.e. either arranged to supply a flow of pressurized air or pressurized hydraulic fluid. The first fluidly controlled brake actuator 108 is arranged in fluid communication with the cylinder 104 at the first end portion 103 of the cylinder, and the second fluidly controlled brake actuator 108' is arranged in fluid communication with the cylinder 104 at the second end portion 105 of the cylinder 104. Hence, a conduit 111 is arranged between the first brake actuator 108 and the first end portion 103 of the cylinder 104. Likewise, a conduit 113 is arranged between the second brake actuator 108' and the second end portion 105 of the cylinder 104. As can also be seen in FIG. 2, the first brake actuator 108 is arranged in fluid communication with the first wheel brake 110, while the second brake actuator 108' is arranged in fluid communication with the second wheel brake 110'. In particular, a conduit 115 is arranged between the first brake actuator 108 and the first wheel brake 110 and a conduit 117 is arranged between the second brake actuator 108' and the second wheel brake 110'. Optionally, the conduit 115 between the first brake actuator 108 and the first wheel brake 110 may comprise a valve 120 for controllably preventing pressurized fluid from the first brake actuator 108 from reaching the first wheel brake 110 or the first end portion 103 of the cylinder 104. Likewise, the conduit 117 between the second brake actuator 108' and the second wheel brake 110' may comprise a valve 120 for controllably preventing pressurized fluid from the second brake actuator 108' from reaching the second wheel brake 110' or the second end portion 105 of the cylinder 104. The valve 120 can also be arranged to control a portion of the flow of fluid to reach the first end portion 103 and another portion of the flow to reach the second end portion 105.

As can be seen in FIG. 2, the steerable wheel axle arrangement 100 also comprises the above described control unit 500. The control unit 500 is preferably connected to the first 108 and second 108' fluidly controlled brake actuators and the valve 120. The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

By means of the above described steerable wheel axle arrangement 100, a flow of pressurized fluid is supplied from the first fluidly controlled brake actuator 108 to the first end portion 103 of the cylinder 104 when actuating the first, left wheel brake 110. In a similar vein, a flow of pressurized fluid is supplied from the second fluidly controlled brake actuator 108' to the second end portion 105 of the cylinder 104 when actuating the second, right wheel brake 110'. Depending on the pressure difference between the pressurized fluid supplied to the first 103 and second 105 end portions of the cylinder 104, the piston 106 will move within the cylinder towards the first end portion 103 or towards the second end portion 105 and move the steering rod 134, thereby steering the first and second wheels. If the fluid pressure is higher at the first end portion 103 compared to the second end portion 105, the piston will move towards the second end portion 105, whereby the wheels will turn left. The steering behavior can be further dependent on e.g. a cross-sectional area of the cylinder inner space, the stiffness of the steering linkage and damper properties, etc.

The steerable wheel axle arrangement 100 in FIG. 2 presents the advantage of being able to increase a steer-by-braking effect. Normally having a bigger brake force, for example, at right hand side will create a yaw moment that steers the vehicle to right. With the steerable wheel axle arrangement 100 in FIG. 2, a brake pressure difference will create a force towards left on the steering linkage, which will cause the wheels to turn right and will create a larger yaw moment compared to a situation without the above configuration. Hence, this steerable wheel axle arrangement 100 can further decrease the turning radius, particularly when connected to a rear wheel axle of the vehicle 10, compared to the only steer by brake case or a passively steered axle without any actuator. Furthermore, the steerable wheel axle arrangement 100 in FIG. 2 can generate a steering force without any braking, when the brake actuators are operated within the crack pressure range. Crack pressure, by definition, is the minimum pressure required for brake pads to touch the brake disk, in other words, it is the minimum actuator pressure, which causes braking. Hence, a steering force could, with the above described system, be obtained by setting a lower crack pressure for the cylinder compared to the crack pressure of the wheel brakes. In further detail, the piston 106 within the cylinder 104 is actuated at a lower flow pressure level compared to the pressure level at which the brakes are actuated. Hereby, steering can be obtained without the use of the valves 120 and without generating any braking.

Figure 3:
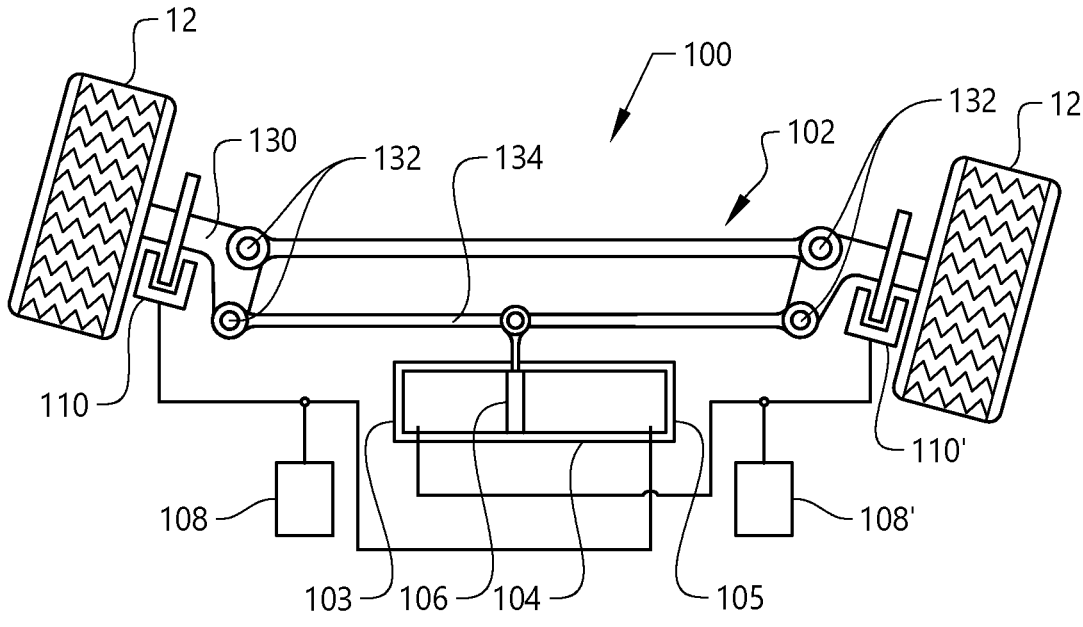
FIG. 3 is a schematic illustration of a steerable wheel axle arrangement according to a second example embodiment.

Reference is now made to FIG. 3 which is a schematic illustration of a steerable wheel axle arrangement according to a second example embodiment. In FIG. 3, as well as the following FIGS. 4 and 5, the valve 120 and the control unit 500 have been omitted for simplicity of illustration. The valves 120 and control unit 500 are thus applicable also for the second example embodiment. Also, the motion damper is excluded from illustration in FIG. 3 as well as the following FIGS. 4 and 5.

The second example embodiment of the steerable wheel axle arrangement 100 in FIG. 3 differs from the first example embodiment depicted in FIG. 2 in that the first fluidly controlled brake actuator 108 is arranged in fluid communication with the second end portion 105 of the cylinder 104, and the second fluidly controlled brake actuator 108' is arranged in fluid communication with the first end portion 103 of the cylinder 104. The first fluidly controlled brake actuator 108 is still arranged in fluid communication with the first wheel brake 110 and the second fluidly controlled brake actuator 108' is still arranged in fluid communication with the second wheel brake 110'.

Hereby, when actuating the first fluidly controlled brake actuator 108, a flow of pressurized fluid will be directed to the second end portion 105 of the cylinder 104, thereby moving the piston towards the first end portion 103. The wheels will hereby turn to the right. When actuating the second fluidly controlled brake actuator 108', a flow of pressurized fluid will be directed to the first end portion 103 of the cylinder 104, thereby moving the piston towards the second end portion 105. The wheels will hereby turn to the left.

By means of the second example embodiment, the steerable wheel axle arrangement 100 can compensate the yaw moment created by an unintended brake pressure difference. In the case shown in FIG. 3, when the left brake pressure is higher, the unequal brake forces create a yaw moment that causes the wheels 110, 110' to turn left. The presented arrangement in FIG. 3 hereby steers the axle to the right due to the force from the piston 106 on the steering rod. Hence, the second embodiment can compensate for the unintended steering.

Furthermore, the steerable wheel axle arrangement according to the second example embodiment can compensate for a split friction case. In detail, when e.g. the first wheel 110 is driven on a surface with high friction, e.g. asphalt, and the second wheel 110' is driven on a surface with low friction, i.e. ice, and a relatively hard braking event takes place, the first wheel 110 is able to brake more due to high friction, whereas the second wheel 110' is not able to brake hard and will slip causing an anti-lock braking system to be activated at the second wheel 110'. This will in turn cause the brake pressure to decrease at the second fluidly controlled brake actuator 108' and the pressure difference will create a force on the steering rod from the piston 106. This force will create a yaw moment that turns the wheels 110, 110' to the right, thereby balancing the yaw moment that turns vehicle to the left due to the unequal braking forces. Compensation for the split friction can be performed either in the front axle, which is typically steered, and/or in any other axle. If the above described steerable wheel axle arrangement is mounted on an axle behind the steering center, all the effects listed so far for both configurations will be reversed. In other words, to increase the steer by braking effect or to create a steering force without any braking, the arrangement in FIG. 3 should preferably be used. Similarly, to compensate yaw moment created by the unintended brake pressure difference or to compensate for the split friction, the steerable wheel axle arrangement in FIG. 2 should be used.

Figure 4:
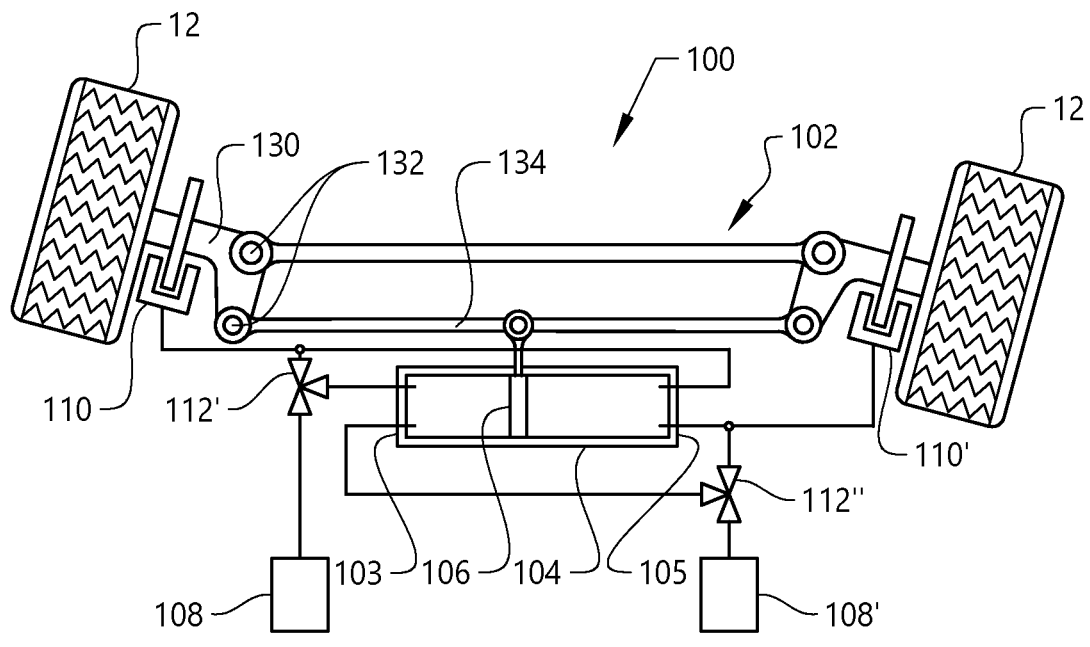
FIG. 4 is a schematic illustration of a steerable wheel axle arrangement according to a third example embodiment.

In order to describe a still further example, reference is made to FIG. 4 which is a schematic illustration of a steerable wheel axle arrangement according to a third example embodiment. As can be seen, the steerable wheel axle arrangement comprises a first steer control valve 112' and a second steer control valve 112". The first fluidly controlled brake actuator 108 is arranged in fluid communication with the first end portion 103 of the cylinder 104 as well as with the second end portion 105 of the cylinder 104. The first steer control valve 112' is arranged in fluid communication between the first fluidly controlled brake actuator 108 and the first 103 and second 105 end portions of the cylinder. The first steer control valve 112' thus controls the flow of pressurized fluid to be directed from the first fluidly controlled brake actuator 108 to either the first end portion 103, the second end portion 105 or to both the first 103 and second 105 end portions. The first fluidly controlled brake actuator 108 is still in fluid communication with the first wheel brake 110, i.e. the first wheel brake 110 is arranged in fluid communication with the first 103 and second 105 end portions of the cylinder 104 as well.

Likewise, the second fluidly controlled brake actuator 108' is arranged in fluid communication with the first end portion 103 of the cylinder 104 as well as with the second end portion 105 of the cylinder 104. The second steer control valve 112" is arranged in fluid communication between the second fluidly controlled brake actuator 108' and the first 103 and second 105 end portions of the cylinder. The second steer control valve 112" thus controls the flow of pressurized fluid to be directed from the second fluidly controlled brake actuator 108' to either the first end portion 103, the second end portion 105 or to both the first 103 and second 105 end portions. The second fluidly controlled brake actuator 108' is still in fluid communication with the second wheel brake 110', i.e. the second wheel brake 110' is arranged in fluid communication with the first 103 and second 105 end portions of the cylinder 104 as well.

By means of the example embodiment depicted in FIG. 4, the first 110 and second 110' wheel brakes can be directly connected to the first 108 and second 108' fluidly controlled brake actuator, respectively. Hereby, the wheel brakes 110, 110' are always ready to be actuated. By using the steer control valves, the behavior of the cylinder 104 can be controlled.

Figure 5:
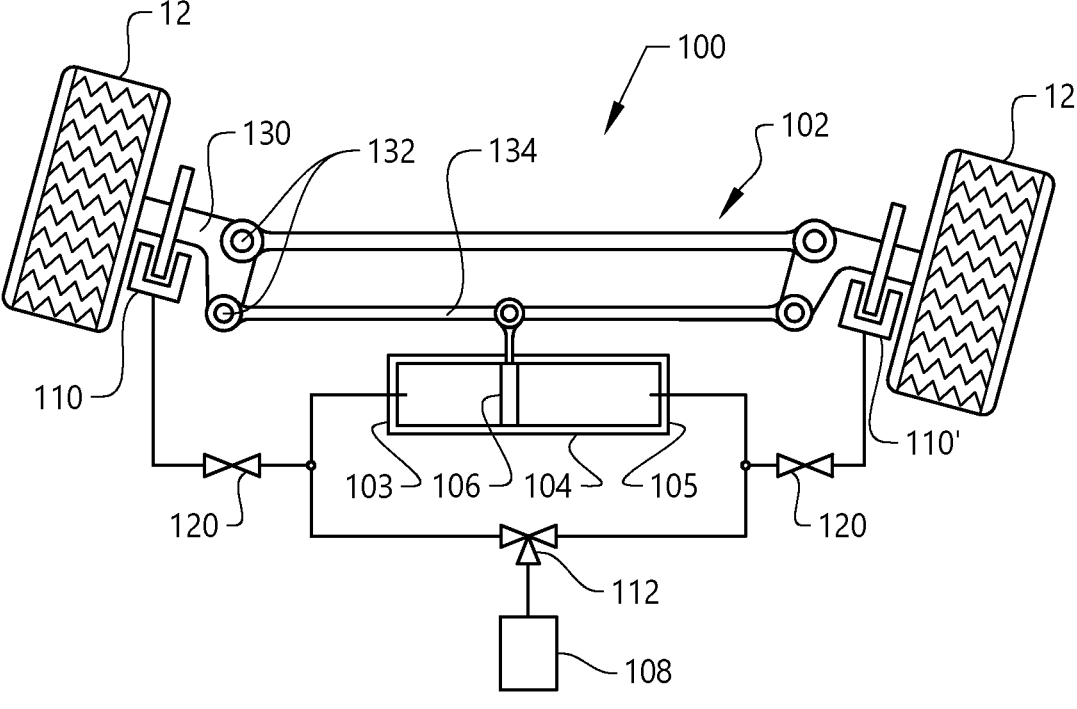
FIG. 5 is a schematic illustration of a steerable wheel axle arrangement according to a fourth example embodiment.

Reference is now made to FIG. 5 which is a schematic illustration of a steerable wheel axle arrangement according to a fourth example embodiment. The main difference between the above described embodiments and the fourth example embodiment of FIG. 5, is that the steerable wheel axle arrangement comprises a single fluidly controlled wheel brake actuator 108, as well as a single steer control valve 112. Hence, the single fluidly controlled wheel brake actuator 108 is arranged in fluid communication with the first 103 and second 105 end portions of the cylinder 104 as well as with the first 110 and second 110' wheel brakes. The steer control valve 112 is arranged in fluid communication between the single fluidly controlled wheel brake actuator 108 and the cylinder 104 as well as between the first 110 and second 110' wheel brakes. The fourth embodiment further explicitly depicts the valves 120, whereby the steer control valve 112 in combination with the valves 120 controls the direction of the flow of pressurized fluid from the single fluidly controlled wheel brake actuator 108.

It should thus be observed that the embodiments depicted in FIGS. 4 and 5 have the ability to be controllably operated as the example embodiment depicted in FIG. 2 as well as the example embodiment depicted in FIG. 3.

Figure 6:
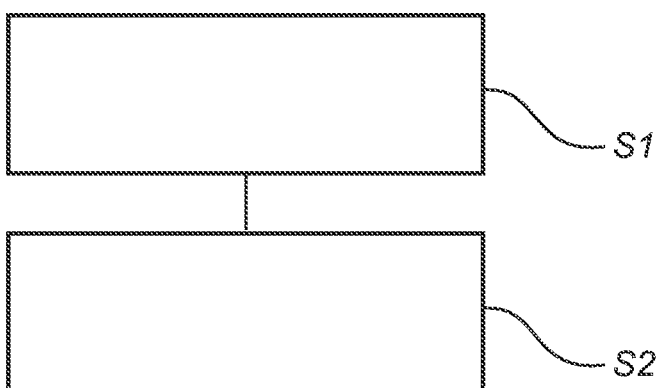
FIG. 6 is a flow chart of a method of controlling the steering system according to an example embodiment.

Finally, and in order to briefly sum up, reference is made to FIG. 6 which is a flow chart of a method of controlling the above described steering system according to an example embodiment. During operation of the vehicle, the above described control unit 500 receives S1 a signal indicative of a steering operation for the vehicle 10. Thereafter, the fluidly controlled brake actuator 108, 108' is controlled S2 to supply a flow of fluid to the cylinder 104 for the piston 106 to exert a steering force on the steering linkage to steer the wheels 12.

It is to be understood that the present disclosure is not limited to the embodiments described above and illustrated in the drawings; rather, the skilled person will recognize that many changes and modifications may be made within the scope of the appended claims.

The invention claimed is:

1. A steerable wheel axle arrangement for a vehicle, the steerable wheel axle arrangement being connectable to a pair of wheels and comprising:
   a steering linkage connectable to the pair of wheels;
   a cylinder comprising a fluidly controlled piston movable within the cylinder, the fluidly controlled piston connected to the steering linkage and movable between:
      a first end portion of the cylinder adapted to be in fluid communication with a first wheel brake of the vehicle for controlling braking of a first wheel of the pair of wheels;
      a second end portion of the cylinder adapted to be in fluid communication with a second wheel brake of the vehicle for controlling braking of a second wheel of the pair of wheels; and
   a fluidly controlled brake actuator, comprising:
      a first fluidly controlled brake actuator adapted to be in fluid communication with the first wheel brake of the vehicle and the first end portion of the cylinder; and
      a second fluidly controlled brake actuator adapted to be in fluid communication with the second wheel brake of the vehicle and the second end portion of the cylinder;
   wherein, upon actuation of the first fluidly controlled brake actuator, fluid flows to the first wheel brake and the first end of the cylinder to move the fluidly controlled piston away from the first wheel to increase a first yaw moment caused by the first wheel brake;
   wherein, upon actuation of the second fluidly controlled brake actuator, fluid flows to the second wheel brake and the second end of the cylinder to move the fluidly controlled piston away from the second wheel to increase a second yaw moment caused by the second wheel brake.

2. The steerable wheel axle arrangement of claim 1, further comprising a steer control valve arrangement arranged in fluid communication between the fluidly controlled brake actuator and the cylinder for controllably directing a flow of fluid from the fluidly controlled brake actuator to the first end portion and the second end portion of the cylinder.

3. The steerable wheel axle arrangement of claim 1:
   wherein the fluidly controlled piston is arranged to exert a steering force on the steering linkage when a pressure level of an actuation fluid from the fluidly controlled brake actuator exceeds a first predetermined threshold limit; and wherein at least one of the first wheel brake and the second wheel brake is arranged to be actuated when the pressure level of the actuation fluid exceeds a second predetermined threshold limit;

the second predetermined threshold limit being higher than the first predetermined threshold limit.

4. The steerable wheel axle arrangement of claim 1, wherein the cylinder comprises a motion damper connected to the fluidly controlled piston.

5. The steerable wheel axle arrangement of claim 1, further comprising:

a valve arranged in fluid communication between the fluidly controlled brake actuator and the wheel brake, the valve being controllable between:

a first state, in which the fluidly controlled brake actuator is in fluid communication with the wheel brake; and a second state, in which a flow of fluid from the fluidly controlled brake actuator is prevented from reaching the wheel brake.

6. The steerable wheel axle arrangement of claim 1, wherein the steering linkage comprises:

a steering knuckle connectable to the wheel;

a steering rod to which the fluidly controlled piston is connected; and a pivot joint connected between the steering knuckle and the steering rod;

wherein the pivot joints pivot and rotate the steering knuckle when the fluidly controlled piston exerts a steering force on the steering rod.

7. The steerable wheel axle arrangement of claim 1, wherein the fluidly controlled brake actuator is one of a pneumatic brake actuator or a hydraulic brake actuator.

8. A vehicle comprising the steerable wheel axle arrangement of claim 1, a pair of wheels connected to the steering linkage, and a wheel brake in fluid communication with the fluidly controlled brake actuator.

9. A method of controlling a steering system connectable to a pair of wheels of a vehicle, the steering system comprising the steerable wheel axle arrangement of claim 1, the method comprising:

receiving a signal indicative of a steering operation for the vehicle; and controlling the fluidly controlled brake actuator to supply a flow of fluid to the cylinder for the piston to exert a steering force on the steering linkage to steer the pair of wheels.

10. The steerable wheel axle arrangement of claim 2, wherein the steer control valve arrangement comprises:

a first steer control valve arranged to controllably deliver a flow of fluid from the first brake actuator to the first end portion or the second end portion of the cylinder; and a second steer control valve arranged to controllably deliver a flow of fluid from the second brake actuator to the first end portion or the second end portion of the cylinder.

11. The steerable wheel axle arrangement of claim 2, wherein the steer control valve arrangement is configured to controllably prevent a flow of fluid from being supplied from the fluidly controlled brake actuator to the cylinder.

12. The vehicle of claim 8, further comprising:

a primary steering system for steering the steerable wheel axle;

wherein the cylinder and fluidly controlled piston form part of a secondary steering system.

\*   \*   \*   \*   \*